July 5, 1927.

G. L. TULLY 1,635,062

BINOCULAR MAGNIFYING LENS HOLDER

Filed Nov. 12, 1926

Inventor

George L. Tully.

By Harry H. Styll.

Attorney

Patented July 5, 1927.

1,635,062

UNITED STATES PATENT OFFICE.

GEORGE L. TULLY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

BINOCULAR MAGNIFYING-LENS HOLDER.

Application filed November 12, 1926. Serial No. 147,947.

This invention relates to holding devices for magnifying lenses and has particular reference to a binocular magnifying lens holder for attachment to an ophthalmic frame or mounting.

The principal object of the invention is to provide holding means for a pair of magnifying lenses which may be detachably attached to a standard ophthalmic mounting or frame.

Another object of the invention is to provide simple and facile means for manually attaching and detaching the holding means to the ophthalmic frame.

Another object is to provide a binocular magnifying attachment for an ordinary ophthalmic mounting or frame.

Other objects and advantages of the invention will become apparent from the following description taken in connection with the accompanying drawings. As many modifications may be made in the details of construction within the scope of the appended claims it is not desired to restrict the invention to the exact details of construction shown and described; the preferred forms of the invention only are shown by way of illustration.

Referring to the accompanying drawings.

Figure 1:
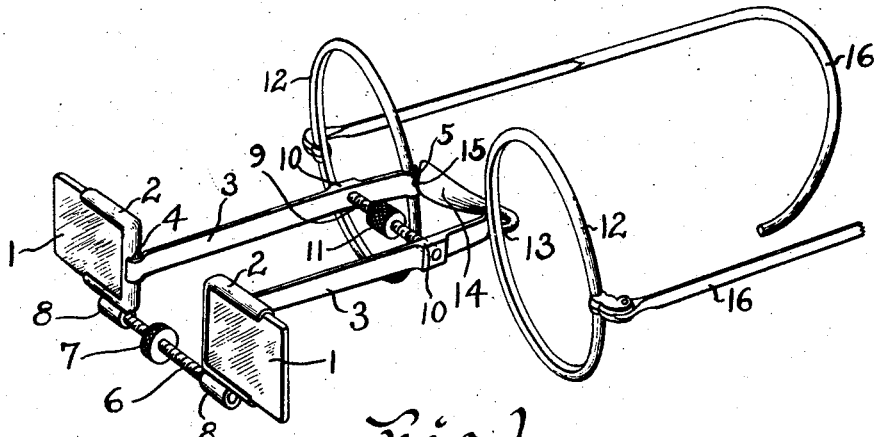
Figure 1 is a perspective view of the invention attached to a spectacle frame.
Figure 2:
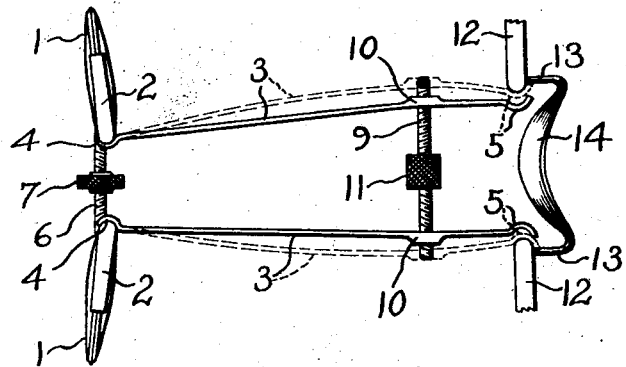
Figure 2 is a top or plan view of Figure 1 showing the spectacle frame partially broken away.

Referring to the drawings, wherein similar reference characters denote similar parts throughout, a pair of magnifying lenses 1 are held in a frame 2. Attached to each frame 2 is a resilient side rod or support 3 soldered or otherwise secured to the frame 2 at the points 4 and having on their opposite ends the hooks 5. These side or extension rods 3 are of thin strips of resilient metal which are springy in their nature and adapted to exert a spring pressure when forced to attaching position. The distance between the lenses 1 may be manually regulated by a right and left hand screw member 6 turned by the thumb wheel 7, the threaded screw 6 entering screw threaded bearings 8 attached to the frames 2. By turning the screw 6 by means of the thumb wheel 7 the lenses 1 may be brought closer together or spaced farther apart as desired. Adjacent the ends of the resilient members 3 opposite the point of attachment 4 of the resilient members to the frames 2 is a second right and left hand screw threaded member 9 operating through screw threaded bearings 10 in the resilient members 3. The screw threaded member 9 is turned or operated by a second thumb wheel 11. By means of the screw threaded member 9 turned by the thumb wheel 11 the hook ends 5 of the resilient member 3 may be made to approach each other or be spaced farther apart as desired.

The hook portions 5 on the resilient member 3 are so made and constructed as to fit over the rims 12 of an ophthalmic mounting, being a spectacle frame in the illustrations. The hooks 5 have a recessed portion 15 which fits over the shank 13 of the bridge member 14 connecting the lens rims 12.

The operation of the device is as follows: The hook members 5 of the resilient arms 3 are drawn towards each other by means of the screw 9 until the distance between the hook members 5 is less than the distance between the rims 12 of the ophthalmic mounting. The hooks 5 are then aligned with the rim members 12 so that the recesses 15 will be aligned with and fit over the shank 13 of the bridge 14. The screw 9 is then operated by the thumb wheel 11 to separate the hooks 5 until they fit tightly against the rims 12, as shown in Figure 1.

It will be understood that the resilient arms 3 are secured to the rims 12 in such a position that the lenses 1 will be in front of the ophthalmic frame, that is, it will extend from the frame in a direction away from the eyes of the wearer. The ophthalmic frame is then secured on the face in the ordinary way, the bridge 14 resting on the nose and the temples 16 extending behind the ears of the wearer. The two lenses 1 may be positioned or focused as desired by means of the screw 6 operated by the thumb wheel 7 adjusting the lenses nearer together or farther apart as required. To detach the device from the ophthalmic frame of mounting it is only necessary to turn the thumb wheel 11 to bring the hook portions 5 towards each other until they are released from the rims 12 and the shank 13 of the bridge 14.

From the foregoing description it will be seen that this device presents a binocular magnifying instrument which may be attached to an ordinary spectacle frame or ophthalmic mounting for use and which may be readily detached therefrom when not required for use. It will also be seen that simple, efficient and inexpensive means have been provided for carrying out the aims and objects of the invention.

Having described my invention, I claim:

1. A holder for a binocular magnifier comprising a pair of separated resilient arms each having engaging members adjacent one end and the lens holding means adjacent the other end, and adjustable means adjacent each end adapted to change the distance between the arms at their respective ends.

2. A holder for a binocular magnifier comprising a pair of separated resilient arms each having hook engaging members adjacent one end and lens holding means adjacent the other end, and screw means adjacent each end to change the distance between the arms at their respective ends.

3. A holder for a binocular magnifier comprising a pair of separated resilient arms each having interlocking engaging members adjacent one end, and lens holding members adjacent the other end, and right and left hand screw means adjacent each end to change the distance between those respective ends.

GEORGE L. TULLY.